(12) United States Patent
Hassan et al.

(10) Patent No.: US 8,491,778 B2
(45) Date of Patent: *Jul. 23, 2013

(54) HIGH SHEAR HYDROGENATION OF WAX AND OIL MIXTURES

(71) Applicant: H R D Corporation, Houston, TX (US)

(72) Inventors: Abbas Hassan, Sugar Land, TX (US); Gregory G. Borsinger, Chatham, NJ (US); Rayford G. Anthony, College Station, TX (US); Aziz Hassan, Sugar Land, TX (US)

(73) Assignee: H R D Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/674,780

(22) Filed: Nov. 12, 2012

(65) Prior Publication Data
US 2013/0067799 A1    Mar. 21, 2013

Related U.S. Application Data

(63) Continuation of application No. 12/692,092, filed on Jan. 22, 2010.

(60) Provisional application No. 61/151,680, filed on Feb. 11, 2009.

(51) Int. Cl.
C11C 5/00 (2006.01)

(52) U.S. Cl.
USPC .......... 208/21; 208/18; 208/19; 208/20; 208/27; 585/1; 585/7; 585/9; 585/250

(58) Field of Classification Search
USPC .......... 208/18–21, 24, 27; 585/1, 7, 9, 250; 366/135.1, 135.2, 135.3; 422/127–128
See application file for complete search history.

(56) References Cited

U.S. PATENT DOCUMENTS

| 3,887,167 | A | 6/1975 | Irwin |
| 5,538,191 | A | 7/1996 | Holl |
| 5,877,350 | A | 3/1999 | Langer et al. |
| 5,935,419 | A | 8/1999 | Khan et al. |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,506,297 | B1 | 1/2003 | Wittenbrink et al. |
| 6,530,964 | B2 | 3/2003 | Langer et al. |

(Continued)

FOREIGN PATENT DOCUMENTS

| CN | 101108999 | 1/2008 |
| CN | 101273000 | 9/2008 |

(Continued)

OTHER PUBLICATIONS

IKA-Rotor-Stator Generators—2003 Processing Ctalog (38 pgs.).

(Continued)

Primary Examiner — Brian McCaig
(74) Attorney, Agent, or Firm — Porter Hedges LLP; Timothy S. Westby

(57) ABSTRACT

Embodiments disclosed herein describe method of producing hydrogenated products, the method that includes providing a wax and an oil; processing the wax and the oil with a gas under high shear conditions to form a high shear product; and hydrogenating the high shear product to produce hydrogenated products. The wax may be a petroleum wax comprising alkane hydrocarbons with formula $C_nH_{2n+2}$, wherein n=20-40.

19 Claims, 4 Drawing Sheets

U.S. PATENT DOCUMENTS

| | | | |
|---|---|---|---|
| 6,742,774 | B2 | 6/2004 | Holl |
| 6,752,529 | B2 | 6/2004 | Holl |
| 6,811,824 | B2 | 11/2004 | Hassan et al. |
| 6,890,982 | B2 | 5/2005 | Borsinger et al. |
| 7,165,881 | B2 | 1/2007 | Holl |
| 7,267,743 | B2 | 9/2007 | Borsinger et al. |
| 7,538,237 | B2 | 5/2009 | Holl |
| 7,575,728 | B2 | 8/2009 | Holl et al. |
| 8,029,661 | B2 | 10/2011 | Palmer et al. |
| 2009/0005621 | A1 | 1/2009 | Hassan et al. |
| 2010/0065469 | A1 | 3/2010 | Palmer et al. |

FOREIGN PATENT DOCUMENTS

| | | | |
|---|---|---|---|
| JP | 2009504846 | | 2/2009 |
| WO | 02064708 | A2 | 8/2002 |
| WO | 2007136259 | | 11/2007 |
| WO | 2008051492 | | 5/2008 |
| WO | 2009002957 | | 12/2008 |
| WO | 2009002960 | | 12/2008 |
| WO | 2009002962 | | 12/2008 |
| WO | 2009003047 | | 12/2008 |

OTHER PUBLICATIONS

Gogate, et al. "Cavitation: A technology on the horizon," Current Science 91, No. 1, Jul. 2006, pp. 35-46 (12 pgs.).
Office Action dated Jun. 25, 2009 for U.S. Appl. No. 12/142,447 (10 pgs.).
Office Action dated Jan. 7, 2010 for U.S. Appl. No. 12/142,447 (6 pgs.).
Office Action dated May 13, 2010 for U.S. Appl. No. 12/142,447 (5 pgs.).
Office Action dated Feb. 4, 2010 for U.S. Appl. No. 12/492,721 (5 pgs.).
Office Action dated Feb. 18, 2010 for U.S. Appl. No. 12/635,433 (6 pgs.).
Office Action dated Feb. 18, 2010 for U.S. Appl. No. 12/635,454 (6 pgs.).
Office Action dated May 14, 2010 for U.S. Appl. No. 12/137,441 (15 pgs.).
Office Action dated Feb. 19, 2010 for U.S. Appl. No. 12/144,459 (10 pgs.).
Office Action dated Sep. 2, 2009 for U.S. Appl. No. 12/142,433 (11 pgs.).
Office Action dated Jan. 29, 2010 for U.S. Appl. No. 12/142,433 (8 pgs.).
Office Action dated May 24, 2011 for U.S. Appl. No. 12/142,433 (10 pgs.).
Office Action dated Apr. 30, 2010 for U.S. Appl. No. 12/141,191 (12 pgs.).
Office Action dated Oct. 27, 2009 for U.S. Appl. No. 12/142,120 (15pgs.).
Office Action dated May 5, 2010 for U.S. Appl. No. 12/571,537 (12 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
Edvardsson, Jonas et al., "Reactors for Hydrogenation of Edible Oils," Journal of American Oil Chemists' Society, vol. 71, No. 3, pp. 235-242, Mar. 1994 (8 pgs.).
Wisniak, J. et al., "Mixing Effects in Dead End Hydrogenation of Oils: Sulfite Oxidation Model," Journal of American Oil Chemists' Society, vol. 48, pp. 379-383, Aug. 1971 (5 pgs.).
International Search Report and Written Opinion dated Sep. 2, 2010 for corresponding International Application No. PCT/US2010/021774 (7 pgs.).
Chinese Office Action dated Aug. 20, 2012 for corresponding Chinese Application No. 201080007555.9 (6 pgs.).
IKA-DRS Reactors website http://www.ikausa.com/dr.him, on Sep. 8, 2010 (2 pgs.).
IKA, "Introduction to IKA's Three Stage Dispax Reactor," Retrieved from <http://www.ikausa.com/pdfs/process/dr%202000-Homogenizing-Dispersing-Suspending-Emulsifying.pdf> on Aug. 22, 2012 (12 pgs.).
Office Action dated Feb. 26, 2013 for corresponding U.S. Appl. No. 13/675,542 (11 pgs.).
Notice of Allowance dated Feb. 5, 2013 for for corresponding U.S. Appl. No. 12/692,092 (11 pgs.).
Notice of Grant dated Jan. 6, 2013 for corresponding Chinese Application No. 201080007555.9 (4 pgs.).
European Search Report dated Apr. 3, 2013 for corresponding European Application No. 10741555.6 (6 pgs.).

HIGH SHEAR HYDROGENATION OF WAX AND OIL MIXTURES

CROSS-REFERENCE TO RELATED APPLICATIONS

This application is a continuation of U.S. patent application Ser. No. 12/692,092, filed Jan. 22, 2010, which claims the benefit under 35 U.S.C. §119(e) of U.S. Provisional Patent Application No. 61/151,680, filed Feb. 11, 2009. The disclosure of each application is hereby incorporated herein by reference in its entirety for all purposes.

STATEMENT REGARDING FEDERALLY SPONSORED RESEARCH OR DEVELOPMENT

Not Applicable.

FIELD OF THE INVENTION

The present invention generally relates to hydrogenation processes. More particularly, the present invention relates to utilizing high shear to hydrogenate multi-blend of wax and oil.

BACKGROUND

Waxes and hard fats have long been used to make candles. Wax has also been used since antiquity as a removable model in lost-wax casting of metals. Chemically, a wax is a type of lipid that comprises long-chain alkanes, esters, polyesters, and hydroxy esters of long-chain primary alcohols and fatty acids. More recently there have been developments where highly hydrogenated triglycerides have also been used as wax alternatives (e.g., U.S. Pat. No. 6,811,824; U.S. Pat. No. 6,890,982; and U.S. Pat. No. 7,267,743). There are different types of waxes: animal waxes (e.g., beeswax), vegetable waxes (e.g., soy wax, rice bran wax), mineral waxes (e.g., Montan wax), petroleum waxes (e.g., paraffin wax, microcrystalline wax), and synthetic waxes (e.g., polyethylene waxes, Fischer-Tropsch waxes). Specifically, paraffin waxes are hydrocarbons, mixtures of alkanes usually in a homologous series of chain lengths. They have been used to coat paper or cloth for water-resistant and stain-resistant functions. In the food industry, paraffin waxes have been utilized as sealants for containers, coatings for foods (e.g., candy, cheese), and food additives (e.g., chewing gum).

Vegetable oils are mostly extracted from plant seeds. In addition to edible vegetable oils, there are inedible types such as linseed oil, tung oil, and castor oil, which are used in lubricants, paints, cosmetics, pharmaceuticals, and certain industrial applications. Chemically, vegetable oils are considered as triesters of glycerin and typically contain fatty acids, monoglycerides, diglycerides, and triglycerides. To increase the melting point of vegetable oils, unsaturated vegetable oils are often transformed through partial or complete hydrogenation, a process wherein a double carbon bond is broken and two hydrogen atoms are added. If all double carbon bonds are eliminated by this process, it is called complete hydrogenation. As the hydrogenation process goes forward, the degree of saturation increases, the viscosity and the melting point of the oil also increase. The degree of hydrogenation is usually measured by the iodine value of the products. The lower the iodine value (IV), the higher the degree of hydrogenation, the higher the melting point.

A phenomenon in hydrogenating oils is that most of the hydrogenation occurs on the end fatty acids because the center arm of the triglyceride is shielded by the end fatty acids to some extent. This causes the resulting products to be more brittle. An example is a more spreadable margarine made from naturally more saturated oils than a margarine made from hydrogenated soy oil. Heavily hydrogenated vegetable oils with high melting point (>48° C. or 120° F.), vegetable waxes, have been used in such applications as candles, boxboard coatings and adhesives. However, these vegetable waxes are brittle because the degree of hydrogenation is high, resulting in hard waxes which tend to crack on flexing and are not suitable for applications such as flexible packaging and adhesives. Vegetable wax for candle-making is generally undesirable because the wax tends to crack on solidifying, which is aesthetically undesirable.

To overcome the deficiencies of low IV hydrogenated vegetable waxes, additives have been used to modify the waxes so that they are more flexible, less brittle with higher melting points. Compounds that have been added include mono- and diglycerides, vinyl polymers, petroleum and microcrystalline waxes, styrene butadiene polymers, fatty acids, alpha olefins, and glycerin. Petroleum oil or waxes can also be blended with vegetable or animal waxes/oils in order to modify their properties. Petroleum waxes are derived from crude oil processing, usually in the process of making lube oil. Synthetic waxes are also made using the Fischer Tropsch process which may involve hydrocracking of higher molecular weight materials into lower molecular weight waxes. Methods of hydrocracking are known to those experienced in the art. Petroleum oils and/or waxes are often hydrotreated when unsaturation of carbon-carbon double bonds is present in order to eliminate the double bond and make the oil or wax more stable. Hydrogen is also used to react with sulfur and or aromatic ring structures that may be present in the oil or wax mix in order to eliminate the sulfur and/or aromatic ring structures. Various catalysts including nickel, copper, various metal oxides and zeolites are often used in the hydrotreating, hydrodesulfurization and hydrocracking processes. But such modifications result in other problems such as (1) additives used to impart flexibility in candles have undesirable burning characteristics; (2) additives are often not renewable, leading to environmental concerns; and (3) additional mixing is required for the addition of additives, which increases manufacture cost and time. Therefore, there continues to be the need and the interest to develop an economic method to produce waxes of superior properties.

SUMMARY

Embodiments disclosed herein describe a method of producing enhanced wax alternatives. The method comprises (1) providing petroleum wax and base oil; (2) mixing said petroleum wax and base oil with a hydrogen-containing gas in a high shear device to form a feedstock; and (3) hydrogenating said feedstock for a time sufficient to produce enhanced hydrogenated products. Hydrogenating the feedstock accomplishes at least one of the following effects: desulfurization, hydrocracking, reduction of unsaturation content of feedstock, and reduction of aromatic content of the feedstock.

The petroleum wax includes alkane hydrocarbons with formula $C_nH_{2n+2}$, wherein n=20-40. The base oil includes butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, other animal tallow, canola oil, castor oil, coconut oil, coriander oil, corn oil, cottonseed oil, hazelnut oil, hempseed oil, linseed oil, mango kernel oil, meadowfoam oil, neatsfoot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sesame oil, sunflower seed oil, tall oil, tsubaki oil, vegetable oils, marine oils, and combinations thereof. In some cases, the base oil comprises soybean oil. In some other cases, the base oil comprises palm oil.

In certain embodiments, the base oil further comprises at least one antioxidant. The antioxidant comprises ascorbyl palmitate, tocopherol, a hindered phenolic compound, or a combination thereof. In certain cases, the feedstock has an iodine value of greater than 70. In embodiments, the feedstock contains 1-99 wt % of petroleum wax and 99-1 wt % of base oil. In certain embodiments, forming the feedstock comprises subjecting the mixture of wax, oil, and hydrogen-containing gas to a shear rate of greater than about 20,000 s$^{-1}$. In some cases, forming the feedstock comprises forming a dispersion comprising hydrogen-containing gas bubbles dispersed in a liquid phase, wherein the gas bubbles have a mean diameter of less than 5.0 μm. In some cases, forming the dispersion comprises contacting hydrogen-containing gas and the liquid phase in a high shear device, wherein the high shear device comprises at least one rotor, and wherein the at least one rotor is rotated at a tip speed of at least 22.9 m/s (4,500 ft/min) during formation of the dispersion. The energy expenditure of the high shear device is greater than 1000 W/m$^3$ during formation of the dispersion.

In certain embodiments, the method of producing enhanced wax alternatives further comprises recycling a portion of the produced hydrogenated products through high shear mixing. In some embodiments, hydrogenating the feedstock includes the use of a nickel catalyst. In some cases, the catalyst is mixed with the petroleum wax, base oil, and hydrogen-containing gas in a high shear device. In some other cases, the catalyst is constructed into the catalytic surface of the high shear device wherein hydrogenation reaction takes place when the mixture of said petroleum wax, base oil, and hydrogen-containing gas comes in touch with the catalytic surface.

In certain embodiments, the method of producing enhanced wax alternatives further comprises introducing a hydrogen donor solvent into the high shear device to form a feedstock. In some cases, the hydrogen donor solvent is introduced by being mixed with the petroleum wax. In some cases, the hydrogen donor solvent is introduced by being mixed with the base oil. In some other cases, the hydrogen donor solvent is introduced by being mixed with both the petroleum wax and the base oil. The hydrogen donor solvent includes tetralin and phenanthrene. In certain embodiments, a blended wax is obtained by mixing petroleum wax with the enhanced hydrogenated product produced by the disclosed method. In certain other embodiments, a blended wax is obtained by mixing esters with the enhanced hydrogenated product produced by the disclosed method.

Embodiments disclosed herein also describe a system for producing enhanced wax alternatives. The system comprises a reactor with at least one inlet and one outlet and at least one high shear mixing device with at least one inlet and one outlet. The at least one outlet of said high shear mixing device is in fluid communication with at least one inlet of said reactor. In some embodiments, the system further comprises a temperature control system, which regulates the temperature of the reactor. In some other embodiments, the system further comprises one or more pumps, which regulates the pressure of said reactor and high shear mixing device. In some cases, the temperature of the reactor is maintained between room temperature and about 200° C. In some cases, the pressure of the reactor is in the range of about 202.65 kPa (2 atm) to about 5.6 MPa-6.1 MPa (55-60 atm). In some other cases, the pressure of the reactor is in the range of about 202.65 kPa (2 atm) to about 5.6 MPa-6.1 MPa (55-60 atm). In yet other cases, the pressure of the reactor is in the range of about 810.6 kPa (8 atm) to about 1.5 MPa (15 atm). In certain cases, the pressure of the reactor is maintained at near atmospheric pressure (1 atm).

In embodiments, the reactor has at least one outlet for gaseous products and at least one outlet for liquid or waxy products. In embodiments, the high shear mixing device comprises at least one rotor and at least one stator separated by a shear gap, wherein the shear gap is the minimum distance between the at least one rotor and the at least stator, wherein the high shear mixing device is capable of producing a tip speed of the at least one rotor of greater than 22.9 m/s (4,500 ft/min). In certain embodiments, the high shear mixing device comprises counter rotating rotors. In certain other embodiments, the high shear mixing device comprises at least one catalytic surface.

Embodiments of the disclosure pertain to a method of producing hydrogenated products that may include providing a wax and an oil; processing the wax and the oil with a gas under high shear conditions to form a high shear product; and hydrogenating the high shear product to produce hydrogenated products. The wax may be a petroleum wax comprising alkane hydrocarbons with formula $C_nH_{2n+2}$, wherein n=20-40. The oil may include at least one antioxidant selected from the group consisting of ascorbyl palmitate, tocopherol, and a hindered phenolic compound.

The method may include recycling a portion of the hydrogenated products through a high shear device; and transferring at lest some high shear product from the high shear device to a reactor. Hydrogenating may occur in the reactor. The high shear device may be configured with a rotor, a stator, and a catalytic surface. The high shear device may be in fluid communication the reactor.

The method may include operating the high shear device at a shear rate in the range of about 20,000 s$^{-1}$ to about 1,600,000 s$^{-1}$. The gas may include hydrogen. The method may also include processing the wax and the oil until the high shear product comprises hydrogen gas bubbles with an average gas bubble diameter less than about 5 μm. The method may include mixing a hydrogen donor solvent with the wax, the oil, or with both, prior to the processing step.

In aspects, the oil may be selected from the group consisting of butterfat, cocoa butter, cocoa butter substitutes, illipe fat, kokum butter, milk fat, mowrah fat, phulwara butter, sal fat, shea fat, borneo tallow, lard, lanolin, beef tallow, mutton tallow, other animal tallow, canola oil, castor oil, coconut oil, coriander oil, corn oil, cottonseed oil, hazelnut oil, hempseed oil, linseed oil, mango kernel oil, meadowfoam oil, neatsfoot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sesame oil, sunflower seed oil, tall oil, tsubaki oil, vegetable oils, marine oils, and combinations thereof.

Hydrogenation may occur at a bulk reaction temperature in the range of about 100° C. to 260° C., and at a bulk reaction pressure in the range from about 202 kPa to about 6 MPa. Hydrogenation may accomplish at least one of the following effects: desulfurization, hydrocracking, reduction of unsaturation content, and reduction of aromatic content. In aspects, the high shear product has an iodine value of greater than 70.

Other embodiments of the disclosure pertain to a method of producing hydrogenated products that may include processing a wax and an oil with a gas comprising hydrogen in a high shear device to form a high shear product; and hydrogenating the high shear product to produce hydrogenated products, wherein the wax is a petroleum wax comprising alkane hydrocarbons with formula $C_nH_{2n+2}$, wherein n=20-40.

The oil may include at least one antioxidant selected from the group consisting of ascorbyl palmitate, tocopherol, a hindered phenolic compound, and combinations thereof.

The method may include transferring at least some high shear product from the high shear device to a reactor, wherein hydrogenating occurs in the reactor. The high shear device may be configured with a rotor, a stator, and a catalytic surface. The high shear device may be in fluid communication with the reactor. The method may include processing the wax and the oil until the high shear product comprises gas bubbles with an average gas bubble diameter less than about 5 μm. The method may further include operating the reactor at a bulk reaction temperature in the range of about 100° C. to 260° C., and at a bulk reaction pressure in the range from about 202 kPa to about 6 MPa. In aspects, the high shear product has an iodine value of greater than 70.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1A:
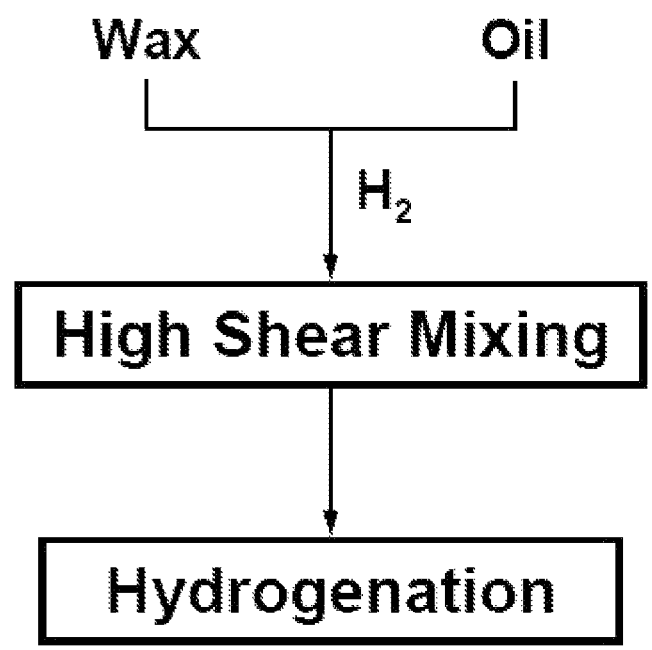
FIG. 1a is a schematic diagram outlining the basic concept of high shear hydrogenation of a multi-blend of wax and oil, in accordance with one embodiment of the present invention.

Certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ".

The term "fatty acid" as used herein is applied broadly to carboxylic acids ($C_6$ to $C_{20}$ typical) which are found in animal fats, vegetable and marine oils. Fatty acids can be found naturally in saturated, mono-unsaturated or poly-unsaturated forms. The natural geometric configuration of fatty acids is cis-isomer configuration. The cis-isomer configuration contributes significantly to the liquidity of these acids. The term "fatty acid" refers to the component of a triglyceride that is the long carbon chain components of the triglyceride.

The term "saturates", "saturated fat", and "saturated fatty acids" as used herein refer to $C_4$ to $C_{26}$ fatty acids or esters containing no unsaturation unless otherwise indicated. The term "unsaturated" refers to the presence of at least one carbon-carbon double bond within the hydrocarbon chain.

The "iodine value" is a measure of the total number of unsaturated double bonds present in a fat or oil. The term "iodine value" or "IV" as used herein refers to the number of grams of iodine equivalent to halogen adsorbed by a 100 gram sample of fat.

The phrase "high in unsaturated fats" includes fats and oils, or mixtures thereof, with an iodine value of greater than 110 as determined by the Wijs method.

The term "trans", "trans fatty acids," "trans isomers" and "trans isomers of fatty acids" as used herein refer to fatty acids and/or esters containing double bonds in the trans configuration usually resulting from hydrogenation or partial hydrogenation of a fat. In low trans fat or oil, less than about 6 weight percent of the total fatty acid composition comprises trans fat.

The terms "fat" and "oil" as used herein are intended to include all edible, fatty acid triglycerides regardless of origin or whether they are solid or liquid at room temperature. Thus, the term "fat" and the term "oil" include normally liquid and normally solid vegetable and animal fats and oils. Natural and synthetic fats and oils are included in these terms.

The term "edible oil" or "base oil" as used herein refers to oil which is substantially liquid at room temperature and has an IV of greater than 70, more preferably greater than 100. The base oil can be unhydrogenated oil or partially hydrogenated oil, modified oil (e.g., bleached and/or deodorized) or mixtures thereof.

As used herein, the term "wax" includes wax feedstock that comprises a certain amount of oil. For example, lube oil feedstock or slack wax are such wax feedstocks, which contain a high oil content. The oil contained in these wax feedstocks is sometimes withdrawn to produce refined wax. Such refined wax is also contemplated to be within the scope of this disclosure.

The term "catalytic surface" is used herein to refer to a surface in a device that is constructed with catalytic material (such as metals, alloys, etc.) so that catalytic activity is manifested when suitable substance comes in touch with said catalytic surface. The use of the term "catalytic surface" in this document includes all such surfaces regardless of the shape and size of surface, material of construct, method of make, degree of activity, or purpose of use.

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

DETAILED DESCRIPTION

Herein disclosed are a system and process of high shear facilitated hydrogenation of multi-blend of wax and oil to produce enhanced vegetable oil waxes. Hydrogenation, as used in this disclosure, accomplishes at least one of the following effects: desulfurization, hydrocracking, reduction of unsaturation content of feedstock, and reduction of aromatic content of the feedstock.

System for Production of Enhanced Wax Alternatives.

FIG. 1a schematically illustrates the basic concept of high shear hydrogenation of multi-blend of wax and oil. 1-99 wt % of wax (e.g., paraffin wax) and 99-1 wt % of oil (e.g., vegetable oil) are mixed in a high shear device together with a certain amount of hydrogen or hydrogen-containing gas ($H_2$). Catalysts for hydrogenation are added to the mixture before or after the high shear device. After high shear processing, the mixture enters the stage of hydrogenation. Without wishing to be limited to a particular theory, high shear mixing is believed to facilitate the hydrogenation reactions and thereby typical high temperatures and pressures are not necessary in this process, which reduces the possibility of molecule degradation—longer chains are broken down to form smaller molecules. Such a process is able to produce enhanced wax alternatives that have preferred melting point, flexibility, and a narrow molecular weight distribution.

Figure 1B:
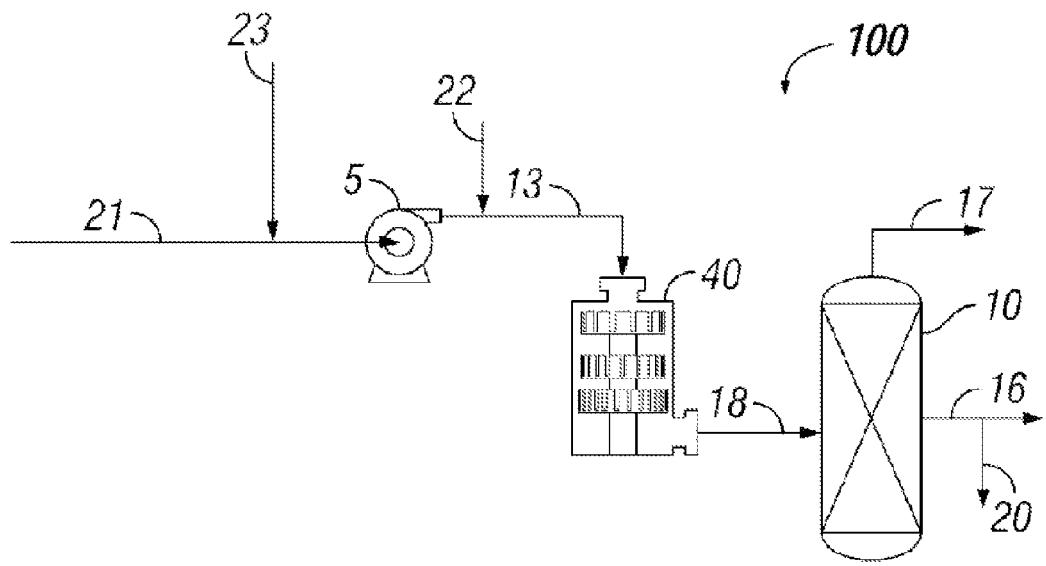
FIG. 1b is a process flow diagram illustrating a configuration for the system and the process of high shear hydrogenation of a multi-blend of wax and oil, in accordance with one embodiment of the present invention.

FIG. 1b is a process flow diagram of one possible configuration for the production of enhanced wax alternatives, according to an embodiment of the present disclosure. In the embodiment of FIG. 1b, system 100 comprises pump 5, external high shear mixing device (HSD) 40, and hydrogenation reactor 10. As shown in FIG. 1b, high shear device 40 is located external to hydrogenation reactor 10. Each of these components is further described in more detail below. Line 21 represents the oil feed stream, which may be connected to pump 5 for introducing oil or fat to be hydrogenated. Line 23 marks the wax feed stream that is to be mixed with oil. In some embodiments, a storage vessel may be added before pump 5 to contain the wax-oil mixture. Line 13 connects pump 5 to HSD 40, and line 18 connects HSD 40 to reactor 10. Line 22 may be connected to line 13 to introduce a hydrogen-containing gas (e.g., $H_2$). Alternatively, line 22 may be connected to an inlet of HSD 40. Line 17 may be connected to reactor 10 for removal of unreacted hydrogen and/or other reaction or product gases. Hydrogenated products are extracted via line 16. In some embodiments, a portion or all of the extracted products is recycled via line 20 for multi-pass processing. Additional components or process steps may be incorporated throughout system 100, if desired, as will become apparent upon reading the description of the process described hereinbelow. For example, line 20 may be connected to line 21 or line 13, to provide for recirculation through HSD 40 and reactor 10 (not shown in FIG. 1b).

High Shear Mixing Device.

External high shear mixing device (HSD) 40, also sometimes referred to as a high shear device or high shear mixing device, is configured for receiving an inlet stream, via line 13, comprising wax, oil to be hydrogenated, and molecular hydrogen. Alternatively, HSD 40 may be configured for receiving the liquid and gaseous reactant streams via separate inlet lines (not shown). Although only one high shear device is shown in FIG. 1b, it should be understood that some embodiments of the system may have two or more high shear mixing devices arranged either in series or parallel flow. HSD 40 is a mechanical device that utilizes one or more generators comprising a rotor/stator combination, each of which has a gap between the stator and rotor. The gap between the rotor and the stator in each generator set may be fixed or may be adjustable. In some embodiments shear may be enhanced with a dual or multiple rotor configurations where the inner rotor and outer rotor are rotating in opposite directions. The outer rotor then encounters a stator similar to the single rotor/stator device. There is increased mechanical complexity and subsequent maintenance of a high shear device with multiple counter rotating rotors renders them most useful when extreme shear is required. HSD 40 is configured in such a way that it is capable of producing submicron and micron-sized bubbles in a reactant mixture flowing through the high shear device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 µl/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 W/m$^3$. In embodiments, the energy expenditure of HSD 40 is in the range of from about 3000 W/m$^3$ to about 7500 W/m$^3$.

The shear rate is the tip speed divided by the shear gap width (minimal clearance between the rotor and stator). The shear rate generated in HSD 40 may be greater than 20,000 s$^{-1}$. In some embodiments the shear rate is at least 40,000 s$^{-1}$. In some embodiments the shear rate is at least 100,000 s$^{-1}$. In some embodiments the shear rate is at least 500,000 s$^{-1}$. In some embodiments the shear rate is at least 1,000,000 s$^{-1}$. In some embodiments the shear rate is at least 1,600,000 s$^{-1}$. In embodiments, the shear rate generated by HSD 40 is in the range of from 20,000 s$^{-1}$ to 100,000 s$^{-1}$. For example, in one application the rotor tip speed is about 40 m/s (7900 ft/min) and the shear gap width is 0.0254 mm (0.001 inch), producing a shear rate of 1,600,000 s$^{-1}$. In another application the rotor tip speed is about 22.9 m/s (4500 ft/min) and the shear gap width is 0.0254 mm (0.001 inch), producing a shear rate of about 901,600 s$^{-1}$.

HSD 40 is capable of highly dispersing or transporting hydrogen into a main liquid phase (continuous phase) comprising unsaturated triglycerides, with which it would normally be immiscible, at conditions such that at least a portion of the hydrogen reacts with the triglyceride to produce a product stream comprising enhanced hydrogenated product. In embodiments, the unsaturated hydrogenation feedstream further comprises a catalyst. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width) between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows the creation of dispersions having a narrow distribution of the desired bubble size (e.g., hydrogen gas bubbles). In some embodiments, each of the stages is operated with super-fine generator. In some embodiments, at least one of the generator sets has a rotor/stator minimum clearance (shear gap width) of greater than about 5.08 mm (0.20 inch). In alternative embodiments, at least one of the generator sets has a minimum rotor/stator clearance of greater than about 1.78 mm (0.07 inch).

Figure 2A:
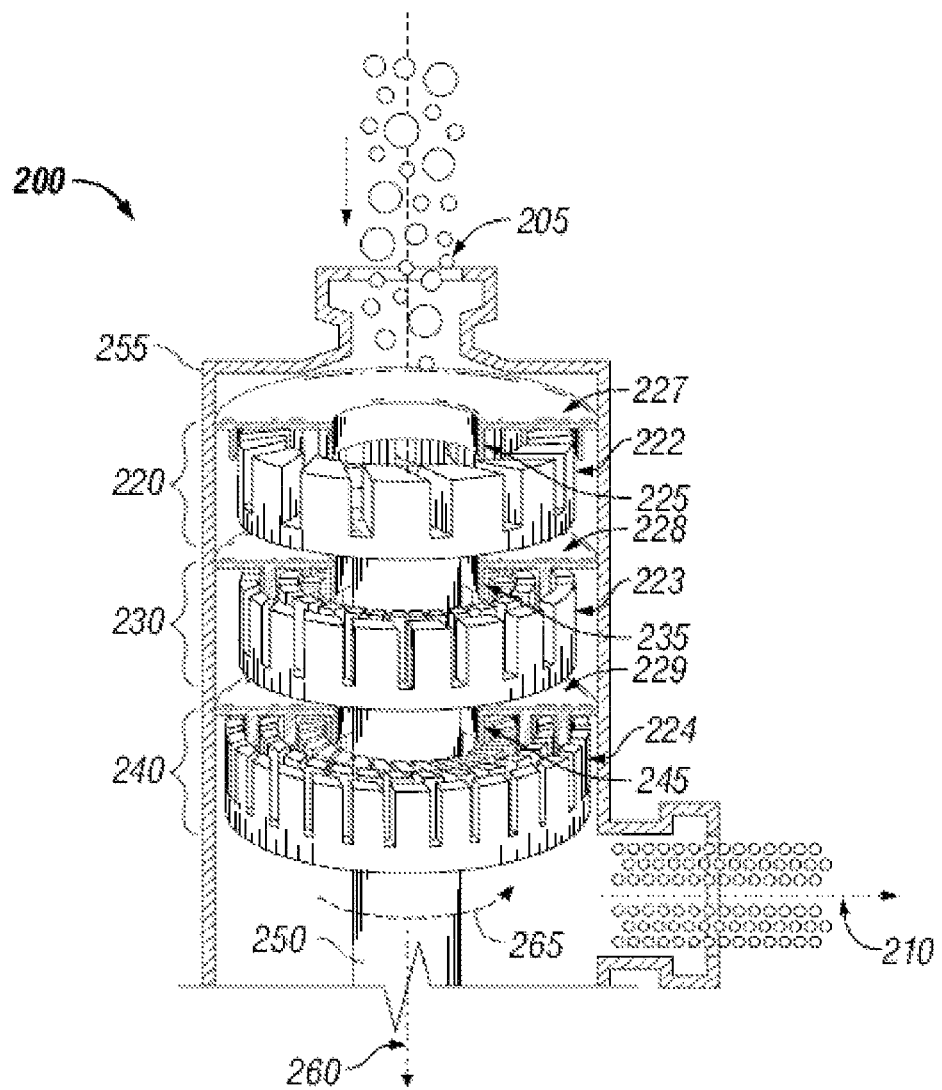
FIG. 2a is a longitudinal cross-section view of a multi-stage high shear device, as employed in an embodiment of the system.
Figure 2B:
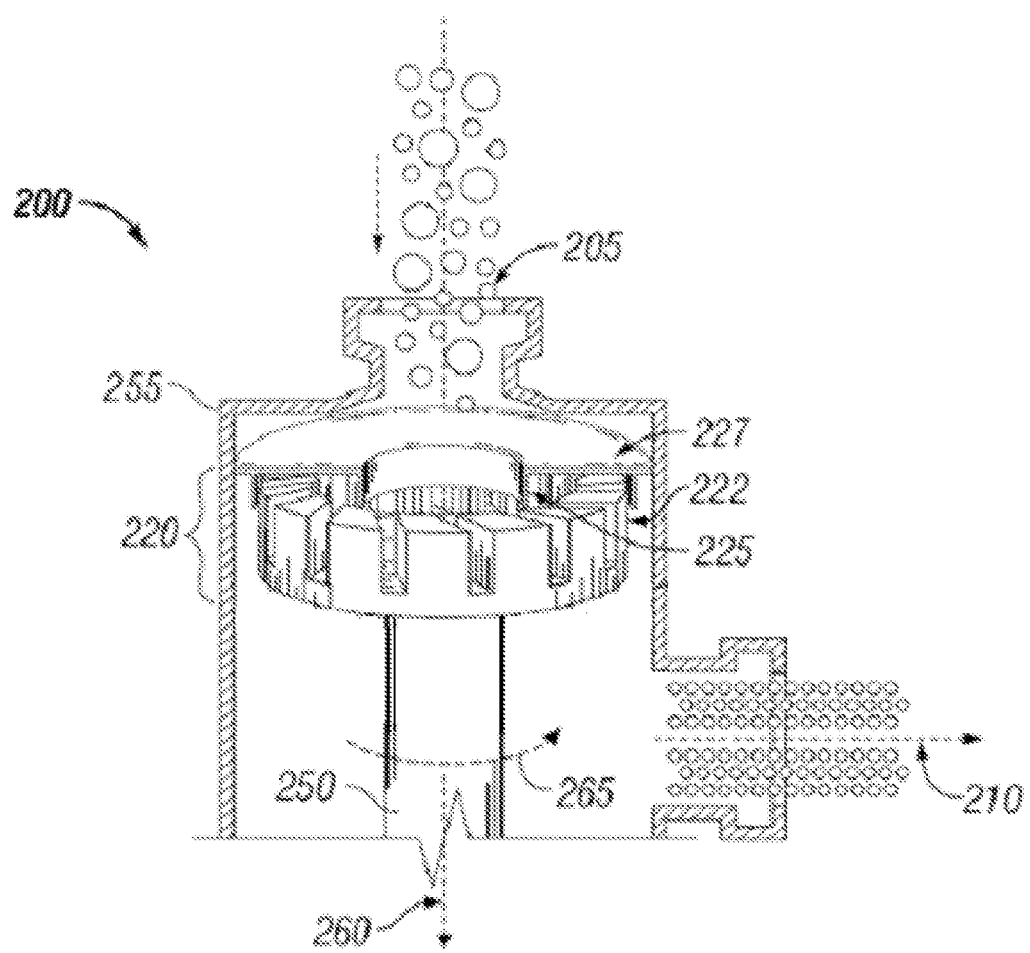
FIG. 2b is a longitudinal cross-section view of a single-stage high shear device, as employed in an embodiment of the system.

Referring now to FIG. 2*a*, there is presented a longitudinal cross-section of a suitable high shear device 200. High shear device 200 of FIG. 2*a* is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250. The number of rotor-stator combinations (one, two, three, etc.) is not meant to limit the scope of the present disclosure. FIG. 2*b* shows a single-stage high shear device, which may also be a suitable high shear mixing device for the subject-matter.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265

(e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 2a, first generator 220 comprises a first shear gap 225; second generator 230 comprises a second shear gap 235; and third generator 240 comprises a third shear gap 245. In embodiments, shear gaps 225, 235, and/or 245 have widths in the range of from about 0.025 mm to about 10.0 mm. Alternatively, the process comprises utilization of a high shear device 200 wherein the gaps 225, 235, and/or 245 have a width in the range of from about 0.5 mm to about 2.5 mm. In certain instances the shear gap width is maintained at about 1.5 mm. Alternatively, the width of shear gaps 225, 235, and 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid particles are to be sent through high shear device 40, the appropriate shear gap width (minimum clearance between rotor and stator) may be selected for an appropriate reduction in particle size and increase in particle surface area. In embodiments, this may be beneficial for increasing catalyst surface area by shearing and dispersing the particles.

In some embodiments, high shear device 200 comprises at least one catalytic surface in any of the rotor/stator stages. In some cases, the catalytic surface is constructed to be part of a rotor. In some cases, the catalytic surface is constructed to be part of a stator. In some cases, the catalytic surface is constructed to be part of a rotor and a stator. When a reactant mixture is introduced into shear device 200, a catalytic reaction is induced when the mixture comes in touch with the catalytic surface.

High shear device 200 is configured for receiving from line 13 a reactant mixture at inlet 205. The reaction mixture comprises hydrogen as the dispersible phase and unsaturated (or partially saturated) hydrogenation feed as the continuous phase. The feed stream may further comprise a particulate solid catalyst component. Feed stream entering inlet 205 is pumped serially through generators 220, 230, and then 240, such that product dispersion is formed. Product dispersion exits high shear device 200 via outlet 210 (and line 18 of FIG. 1b). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces that are exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1b).

The product dispersion has an average hydrogen gas bubble size less than about 5 µm under atmospheric pressure. Under pressurized conditions (externally-applied or shear-induced), the size of the gas bubbles decreases as the pressure increases. This principle applies to the description pertaining to gas bubble sizes hereinafter. Unless otherwise described, the size of the gas bubbles is specified under atmospheric pressure. In embodiments, HSD 40 produces a dispersion having a mean bubble size of less than about 1.5 µm. In embodiments, HSD 40 produces a dispersion having a mean bubble size of less than 1 µm; preferably the bubbles are sub-micron in diameter. In certain instances, the average bubble size is from about 0.1 µm to about 1.0 µm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid catalyst particles, thereby facilitating and accelerating the catalytic reaction through enhanced transport of reactants.

In certain instances, high shear device 200 comprises a Dispax Reactor® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle or bubble size in dispersion in line 18 (FIG. 1b) exiting outlet 210 (FIG. 2a) of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2 HP power, output speed of 7900 rpm, flow capacity (water) approximately 300-700 L/h (depending on generator), a tip speed of from 9.4-41 m/s (1850 ft/min to 8070 ft/min).

Reactor.

Hydrogenation reactor 10 (FIG. 1b) is any type of vessel in which hydrogenation can propagate. For instance, a continuous or semi-continuous stirred tank reactor, or one or more batch reactors may be employed in series or in parallel. In some applications reactor 10 may be a tower reactor, and in others a tubular reactor or multi-tubular reactor. Any number of reactor inlet lines is envisioned, with one shown in FIG. 1b (line 18). An inlet line (not shown in FIG. 1b) may be used to introduce a catalyst or catalyst slurry to reactor 10 in certain embodiments. Catalyst or catalyst slurry may also be added via line 21, 23, or 13 (not shown in FIG. 1b) to be mixed with the wax-oil mixture in HSD 40. But caution needs to be taken so that catalyst is not degraded to a large extent due to the high shear force in HSD 40 so that catalyst does not lose its hydrogenation activity. Reactor 10 may comprise an exit line 17 for vent gas, and an outlet product line 16 for a hydrogenated product stream. In embodiments, reactor 10 comprises a plurality of reactor product lines 16.

Hydrogenation reactions will occur whenever suitable time, temperature and pressure conditions exist. In this sense hydrogenation could occur wherever temperature and pressure conditions are suitable. Where a circulated slurry based catalyst is utilized, reaction is more likely to occur at points outside reactor 10 shown of FIG. 1b. Nonetheless a discrete reactor/reactor 10 is often desirable to allow for increased residence time, agitation and heating and/or cooling. When reactor 10 is utilized, the reactor may be a fixed bed reactor, a fluidized bed reactor, or a transport bed reactor and may become the primary location for the hydrogenation reaction to occur due to the presence of catalyst and its effect on the rate of hydrogenation.

Thus, reactor 10 may be any type of reactor(s) in which hydrogenation may propagate. For example, reactor 10 may comprise one or more tanks or tubular reactors in series or in parallel. The hydrogenation reaction may be a homogeneous catalytic reaction in which the catalyst is in the same phase as another component of the reaction mixture or a heterogeneous catalytic reaction involving a solid catalyst. When reactor 10 is utilized, reactor 10 may be operated as a slurry reactor, a fixed bed reactor, a trickle bed reactor, a fluidized bed reactor, a bubble column, or other method known to one of skill in the art.

Reactor 10 may include one or more of the following components: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger. Alternatively, as much of the reactant(s) conversion(s) may occur within HSD 40 in some embodiments, reactor 10 may serve primarily as a storage vessel in some cases. Although generally less desired, in some applications reactor 10 may be omitted, particularly if multiple high shear devices/reactors are employed in series, as further described below.

Heat Transfer Devices.

In addition to the above-mentioned heating/cooling capabilities of reactor 10, other external or internal heat transfer devices for heating or cooling a process stream are also contemplated in variations of the embodiments illustrated in FIG. 1b. For example, heat may be added to or removed from reactor 10 via any method known to one skilled in the art. The use of external heating and/or cooling heat transfer devices is also contemplated. Some suitable locations for one or more such heat transfer devices are between pump 5 and HSD 40, between HSD 40 and reactor 10, and between reactor 10 and pump 5 when the high shear hydrogenation is operated in multi-pass mode. Some non-limiting examples of such heat transfer devices are shell, tube, plate, and coil heat exchangers, as are known in the art.

Pumps.

Pump 5 is configured for either continuous or semi-continuous operation, and may be any suitable pumping device that is capable of providing greater than 202.65 kPa (2 atm) pressure, preferably greater than 303.975 kPa (3 atm) pressure, to allow controlled flow through HSD 40. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional, high pressure pump(s) (not shown) may be included in the systems illustrated in FIG. 1b. For example, a booster pump, which may be similar to pump 5, may be included between HSD 40 and reactor 10 for boosting the pressure into reactor 10, or a recycle pump may be positioned on line 17 for recycling gas from reactor 10 to HSD 40. As another example, a supplemental feed pump, which may be similar to pump 5, may be included.

Production of Enhanced Wax Alternatives.

Description of a process for producing enhanced wax alternatives from wax-oil mixtures will now be made with reference to FIG. 1b.

The starting materials that may be used in this invention vary widely. For purposes herein, starting materials include one or more refined or unrefined, bleached or unbleached and/or deodorized or non-deodorized fats and/or oils. The fats and oils may comprise a single fat or oil or combinations of more than one fat and/or oil. The starting triglyceride oil or fat in the feedstream (hereinafter referred to as "base oil") comprises non-hydrogenated and/or partially hydrogenated oil. The fats and oils may be saturated, mono-unsaturated or poly-unsaturated or any combination thereof. The base oil may be selected from the group consisting of fish oils, animal oils, vegetable oils, synthetic oils, genetically-modified plant oils, and derivatives and/or mixtures thereof. In embodiments, the base oil comprises vegetable oil. In some cases, the starting material is mono-unsaturated or poly-unsaturated vegetable oil. In some other cases, the starting material is a poly-unsaturated vegetable oil. In yet other cases, the starting triglyceride base oil is a refined, bleached and deodorized (RBD) vegetable oil. In embodiments, the base oil starting triglyceride comprises vegetable oil selected from the group consisting of soybean, palm, rapeseed, safflower, canola, peanut, cottonseed, palm kernel, olive, castor, sunflower, corn, hazelnut, rice bran, sesame, and linseed oils. Petroleum waxes include slack wax, microcrystalline wax petrolatum, and paraffin waxes. Paraffin waxes include alkane hydrocarbons with the general formula $C_nH_{2n+2}$, wherein n is in the range of 20-40.

As mentioned hereinabove, the iodine value is a common measurement of the degree of unsaturation of an oil. In embodiments, the base oil has an IV of from about 70 to more than about 170. In embodiments, the oil feedstock is a liquid at room temperature. In certain embodiments, the oil feedstock is a mixture of oils that are solid at room temperature and oils that are liquid at room temperature. In embodiments, the wax feedstock is a solid at room temperature. In some cases, the base oil subjected to the present invention has an iodine value of above 120. In some cases, the base oil IV is above 130. In some other cases, the base oil IV is above 135. In yet other case, the base oil IV is above 140. In embodiments, the base oil is crude soy oil having an iodine value in the range of from about 130 to 135. In embodiments, the base oil comprises primarily triglyceride oil with an iodine value above about 70. In certain embodiments, this iodine value is above about 130. In other embodiments, the iodine value is above about 170. The base oil may be modified, such as by bleaching or deodorizing. The base oil may contain trace amounts of free fatty acids. Sources of base oils and methods used to make base oils are known to those of skill in the art.

In embodiments, the base oil is derived from naturally occurring liquid oils such as sunflower oil, canola, soybean oil, olive oil, corn oil, peanut oil, safflower oil, high oleic sunflower oil, safflower oil, glycerol esters of purified fatty acid methyl esters, polyglycerol esters, and combinations thereof. Suitable liquid oil fractions may also be obtained from palm oil, lard, and tallow, for example, as by fractionation or by direct interesterification, followed by separation of the oil.

The base oil may have a tendency to oxidize. In such instances, an antioxidant may be added to the base oil in line 21. Some oils contain a natural antioxidant and others are naturally stable to oxidation. For the naturally stable oils, it may not be necessary to add an antioxidant. The amount of antioxidant added depends on several factors including the end use of the oil, the temperature, pressure, and amount of oxygen to which the oil will be exposed, as well as the duration of exposure. In embodiments, the base oil comprises antioxidant in the range of from about 0.1% to about 0.5% by weight.

A wide variety of antioxidants are suitable for use, including but not limited to tocopherol, butylated hydroxytoluene (BHT), butylated hydroxyanisole (BHA), tertiary butylhydroquinone (TBHQ), ethylenediaminetetracetic acid (EDTA), gallate esters (i.e. propyl gallate, butyl gallate, octyl gallate, dodecyl gallate, etc.), tocopherols, citric acid, citric acid esters (i.e. isopropyl titrate, etc.), gum guaiac, nordihydroguaiaretic acid (NDGA), thiodipropionic acid, ascorbic acid, ascorbic acid esters (i.e. ascorbyl palmitate, ascorbyl oleate, ascorbyl stearate, etc.) tartaric acid, lecithin, methyl silicone, polymeric antioxidant (Anoxomer) plant (or spice and herb) extracts (i.e. rosemary, sage, oregano, thyme, marjoram, etc.), and mixtures thereof. In embodiments, the antioxidant is ascorbyl palmitate. In embodiments, the antioxidant is ascorbyl palmitate in combination with tocopherol. Other types of antioxidants include polymer stabilizers, such as hindered phenolic compounds. An example of hindered phenolic compounds is Ciba® IRGANOX® 1010. The hydrogen-donating antioxidants (such as, hindered phenols and secondary aromatic amines), inhibit oxidation and increase stability by competing with organic substrate for peroxy radicals, thereby terminating the chain reaction and stabilizing any further oxidation reactions. In some cases, antioxidants such as ascorbyl palmitate, tocopherol, and hindered phenolic compounds may be used in combination.

The heating and hydrogenation reaction may be conducted in batch, continuous or semi-continuous mode depending on the needs of the user. In embodiments, semi-continuous and continuous operation allow for perpetual processing by continuous introduction of starting materials (e.g. base oil and/or catalyst) to system 100.

Addition of petroleum waxes to a hydrogenation feedstock oil may beneficially modify the properties of the hydrogenated vegetable oil product. The enhanced hydrogenated product (hereinafter EHP) may be used as a partial or complete substitute for petroleum wax and petroleum wax blends. In embodiments, the addition of petroleum wax to hydrogenation feedstock oil results in plasticizing of the finished vegetable oil wax rendering it suitable as an alternative to petroleum waxes such as petrolatum and microcrystalline wax as well as conventional paraffin wax.

Hydrogenation of a feedstock oil comprising petroleum waxes may be performed by any means known to those in the art. In embodiments, hydrogenation is carried out by reacting the oil-wax mixture with gaseous hydrogen at elevated temperature and pressure. In embodiments, high shear is utilized to enhance the hydrogenation of an oil comprising petroleum waxes. In embodiments, an external high shear mixer is used to accelerate the hydrogenation reaction. In such embodiments, hydrogen, hydrogenation feedstock, and optionally catalyst are mixed in a high shear mixer and introduced to a reactor 10 where the reaction conditions are controlled over time until a desired IV value is reached.

Hydrogenation of a feedstock oil comprising petroleum waxes utilizing high shear will now be discussed with reference to FIG. 1b. By adjusting the flow rates of feed streams 21 and 23, hydrogenation feedstock (oil-wax mixture) in line 13 may comprise from 1 weight percent to 99 weight percent of unsaturated base oil and from 99 weight percent to 1 weight percent of petroleum wax. In operation for the hydrogenation reaction, a dispersible hydrogen-containing gas stream is introduced into line 22, and combined in line 13 with the hydrogenation feedstock. The hydrogen-containing gas may be substantially pure hydrogen, or a gas stream comprising hydrogen.

In embodiments, the hydrogen-containing gas is fed directly into HSD 40, instead of being combined with the liquid hydrogenation feedstock in line 13. Pump 5 may be operated to pump the hydrogenation feedstock and to build pressure and feed HSD 40, providing a controlled flow throughout high shear device (HSD) 40. In some embodiments, pump 5 increases the pressure of the HSD inlet stream to greater than 202.65 kPa (2 atm), preferably greater than about 303.975 kPa (3 atmospheres). In this way, high shear may be combined with pressure to enhance reactant intimate mixing and hydrogenation.

In embodiments, reactants and, if present, catalyst (for example, aqueous solution, and catalyst) are first mixed in reactor 10. Reactants enter reactor 10 via, for example, inlet lines (not shown in FIG. 1b). Any number of reactor 10 inlet lines is envisioned. In an embodiment, reactor 10 is charged with catalyst and the catalyst if required, is activated according to procedures recommended by the catalyst vendor(s).

After pumping, hydrogen and hydrogenation feedstock in line 13 are mixed within HSD 40, which serves to create a fine dispersion of the hydrogen-containing gas in the hydrogenation feedstock. In HSD 40, the hydrogen-containing gas and hydrogenation feedstock are highly dispersed such that nanobubbles, submicron-sized bubbles, and/or microbubbles of hydrogen are formed for superior dissolution into solution and enhancement of reactant mixing. For example, disperser IKA® model DR 2000/4, a high shear, three stage dispersing device configured with three rotors in combination with stators, aligned in series, may be used to create the dispersion of dispersible hydrogen-containing gas in liquid phase comprising hydrogenation feedstock (i.e., "the reactants"). The rotor/stator sets may be configured as illustrated in FIG. 2a, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/stator combination, which may comprise a rotor and a stator having rotor teeth and stator teeth, respectively. The dispersion exits the high shear device via line 18. In some embodiments, the shear rate increases stepwise longitudinally along the direction of the flow, 260.

For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If the high shear device 40 includes a PTFE seal, the seal may be cooled using any suitable technique that is known in the art. For example, the reactant stream flowing in line 13 or line 21 may be used to cool the seal and in so doing be preheated as desired prior to entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the hydrogen-containing gas and the hydrogenation feedstock. In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the rate of reaction is increased by greater than a factor of about 5. In some embodiments, the rate of reaction is increased by at least a factor of 10. In some embodiments, the rate is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm$^2$ under cavitation conditions. The high shear mixing results in dispersion of the hydrogen-containing gas in micron or submicron-sized bubbles. In some embodiments, the resultant dispersion has an average bubble size less than about 1.5 μm. Accordingly, the dispersion exiting HSD 40 via line 18 comprises micron and/or submicron-sized gas bubbles. In some embodiments, the mean bubble size is in the range of about 0.4 μm to about 1.5 μm. In some embodiments, the resultant dispersion has an average hydrogen bubble size less than 1 μm. In some embodiments, the mean bubble size is less than about 400 nm, and may be about 100 nm in some cases. In many embodiments, the microbubble dispersion is able to remain dispersed at atmospheric pressure for at least 15 minutes.

Once dispersed, the resulting gas/liquid or gas/liquid/solid (in cases where solid catalyst is mixed in HSD 40) dispersion exits HSD 40 via line 18 and feeds into reactor 10, as illustrated in FIG. 1b. As a result of the intimate mixing of the reactants prior to entering reactor 10, a significant portion of the chemical reaction may take place in HSD 40, with or without the presence of a catalyst. Accordingly, in some embodiments, reactor/reactor 10 may be used primarily for heating and separation of unreacted hydrogen gas from the enhanced hydrogenated product and recycling this hydrogen back to the inlet of the HSD. Alternatively, or additionally, reactor 10 may serve as a primary reaction vessel where most of the hydrogenation occurs. For example, in embodiments, reactor 10 is a fixed bed reactor comprising a fixed bed of hydrogenation catalyst.

Hydrogenation reactor 10 may be operated in either continuous or semi-continuous flow mode, or it may be operated in batch mode. The contents of reactor 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents may be stirred continuously or semi-continuously.

Hydrogen Donor Solvent.

In certain embodiments, a hydrogen donor solvent is utilized to enhance hydrogenation reactions in the production of enhanced wax alternatives. A hydrogen donor solvent is a solvent composed of hydronaphthalenes with transferable hydrogens, such as tetralin and phenanthrene. In most cases, hydrogen donor solvents contain aromatic groups; and as a result enhanced wax alternatives produced under the enhancement of a hydrogen donor solvent are suitable for wax applications other than foods. In some embodiments, a hydrogen donor solvent is mixed with the wax and then introduced into the high shear device. In some embodiments, a hydrogen donor solvent is mixed with the oil and then introduced into the high shear device. In some embodiments, a hydrogen donor solvent is mixed with both the wax and the oil and then introduced into the high shear device. In yet some other embodiments, a hydrogen donor solvent is introduced into the high shear device as a separate stream.

Catalyst.

If a catalyst is used to promote hydrogenation, the catalyst may be introduced into reactor 10 as a slurry or catalyst stream. Alternatively, or additionally, catalyst may be added elsewhere. For example, in embodiments, catalyst slurry may be injected directly into line 21. In embodiments, reactor 10 comprises any catalyst known to those of skill in the art to be suitable for hydrogenation. In embodiments, a nickel hydrogenation catalyst is utilized.

The bulk or global operating temperature of hydrogenation feedstock reactant is desirably maintained below the flash point. In some embodiments, the operating conditions for high shear hydrogenation comprise a temperature in the range of from room temperature to about 260° C. In embodiments, the temperature is in the range of from about 100° C. to 230° C. In embodiments, the temperature is in the range of from about 160° C. to 180° C. In some embodiments, the reaction temperature in reactor 10 is from room temperature to about 200° C. In some other embodiments, the reaction temperature in reactor 10 is from 100° C. to 180° C. In specific embodiments, the reaction temperature in reactor 10, in particular, is in the range of from about 155° C. to about 160° C. In some embodiments, the reaction pressure in reactor 10 is in the range of from about 202.65 kPa (2 atm) to about 5.6 MPa-6.1 MPa (55-60 atm). In some embodiments, reaction pressure is in the range of from about 810.6 kPa to about 1.5 MPa (8 atm to about 15 atm). In embodiments, reactor 10 is operated at or near atmospheric pressure.

Optionally, the dispersion in line 18 may be further processed prior to entering reactor 10, if desired. In reactor 10, hydrogenation occurs/continues via reaction with hydrogen. The contents of the vessel may be stirred continuously or semi-continuously, the temperature of the reactants may be controlled (e.g., using a heat exchanger), and the fluid level inside reactor 10 may be regulated using standard techniques. Hydrogenated product may be produced either continuously, semi-continuously or batch wise, as desired for a particular application. Excess unreacted hydrogen gas may exit reactor 10 via gas line 17. In embodiments the reactants and conditions are selected so that the gas stream in line 17 comprises less than about 6% unreacted hydrogen by weight. In some embodiments, the reaction gas stream in line 17 comprises from about 1% to about 4% hydrogen by weight. The reaction gas removed via line 17 may be further treated, and the unreacted hydrogen may be recycled, as desired, for example to HSD 40.

Enhanced hydrogenated product (hereinafter EHP) exits reactor 10 by way of line 16. The EHP may be suitable as an alternative to petroleum-based waxes such as paraffin and microcrystalline waxes in applications including adhesives, candles, paper coatings, fire logs, particle board, composite board, asphalt modification, fruit coating, gypsum board, cable filling, cosmetics as replacements for petrolatum, as plastic lubricants in PVC and other applications where petroleum waxes are conventionally utilized. The attributes of the EHPs may include flexibility, tack and/or hardness modification. Replacement of from 1% to 100% by weight of a petrolatum or micro-crystalline wax material may be made. As opposed to conventional hydrogenated waxes which tend to become hard and brittle as hydrogenation levels are increased (as iodine value decreases), the EHPs according to embodiments of this disclosure may overcome these deficiencies.

The amount of petroleum waxes may be adjusted to alter the melting point of the resulting EHP to within a desired range. In embodiments, the EHP has a melting point of from about 40° C. to 50° C. (110° F. to 120° F.); in embodiments, the EHP has a melting point of from about 70° C. to about 75° C. (160° F. to about 165° F.). In embodiments, EHP is suitable for use as, for example, candle wax as the brittleness is decreased by the presence of petroleum waxes in the hydrogenation feedstock.

In embodiments, from 1 weight percent to 99 weight percent EHP is blended with from 99 weight percent to 1 weight percent of a traditional petroleum wax. The addition of the EHP to traditional petroleum wax may serve as a tackifier/binder in place of conventional tackifiers and binders, such as ethylene vinyl acetate (EVA). The use of EHP in place of traditional chemical binders is desirable, as the EHP is biodegradable. Also, the EHP may be food grade, and the wax suitable for edible purposes, such as for coating produce boxes.

In another embodiment, esters such as mono-, di-, tri-, tetra-, or penta-ester may be added to modify or enhance the desired physical characteristics of the final composition.

In some embodiments it may be desirable to pass the contents of reactor 10 through HSD 40 during a second pass. In this case, line 16 may be connected to line 21 as indicated by line 20, such that at least a portion of the contents of line 16 is recycled from reactor 10 and pumped by pump 5 into line 13 and thence into HSD 40. Additional hydrogen-containing gas may be injected via line 22 into line 13, or it may be added directly into the high shear device (not shown). In other embodiments, product stream in line 16 may be further treated (for example, separation of saturated product therefrom) prior to recycling a portion of the unsaturated liquid in the product stream to high shear device 40.

In some embodiments, two or more high shear devices like HSD 40, or configured differently, are aligned in series, and are used to further enhance the hydrogenation reaction. The operation of multiple devices may be in either batch or continuous mode. In some instances in which a single pass or "once through" process is desired, the use of multiple high shear devices in series may also be advantageous. In some embodiments where multiple high shear devices are operated in series, reactor 10 may be omitted. For example, in embodiments, outlet dispersion in line 18 may be fed into a second high shear device. When multiple high shear devices 40 are operated in series, additional hydrogen gas may be injected into the inlet feedstream of each device. In some embodiments, multiple high shear devices 40 are operated in parallel, and the outlet dispersions therefrom are introduced into one or more reactor 10.

Features.

The application of enhanced mixing of hydrogen and hydrogenation feedstock within HSD 40 potentially permits faster and/or more complete hydrogenation of the hydrogenation feedstock. In some embodiments, the enhanced mixing potentiates an increase in throughput of the process stream. In some embodiments, the high shear mixing device is incorporated into an established process, thereby enabling an increase in production (i.e., greater throughput). In contrast to some methods that attempt to increase the degree of hydrogenation by simply increasing reactor pressures, the superior dispersion and contact provided by external high shear mixing may allow in many cases a decrease in overall operating pressure while maintaining or even increasing reaction rate. Without wishing to be limited to a particular theory, it is believed that the level or degree of high shear mixing is sufficient to increase rates of mass transfer and also produces localized non-ideal conditions that permit reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods induces cavitation whereby hydrogen and triglycerides are dissociated into free radicals, which then react to produce enhanced hydrogenated product.

The increased surface area of the micrometer sized and/or submicrometer sized hydrogen bubbles in the dispersion in line 18 produced within high shear device 40 results in faster and/or more complete reaction of hydrogen gas with unsaturated oil in the hydrogenation feedstock introduced via line 13. As mentioned hereinabove, additional benefits are the ability to operate reactor 10 at lower temperatures and pressures resulting in both operating and capital cost savings. The benefits of the use of high shear in the hydrogenation include, but are not limited to, faster cycle times, increased throughput, reduced operating costs and/or reduced capital expense due to the possibility of designing smaller hydrogenation reactors, and/or operating the hydrogenation reactor at lower temperature and/or pressure.

The use of an external high shear mechanical device provides rapid contact and mixing of hydrogen and hydrogenation feedstock in a controlled environment in the reactor/high shear device. The high shear device reduces the mass transfer limitations on the hydrogenation reaction and thus may increase the overall reaction rate, reduce the amount of unreacted hydrogen, increase the degree of saturation in the enhanced hydrogenation product, and/or allow substantial hydrogenation under global operating conditions under which substantial reaction may not be expected to occur.

The above description may have utilized vegetable oils in exemplary embodiments for the disclosed process. However, it is easily understood by those skilled in the art that the disclosed process applies to a large variety of fats and oils, including butterfat, cocoa butter, cocoa butter substitutes, illipe fat, kokum butter, milk fat, mowrah fat, phulwara butter, sal fat, shea fat, bomeo tallow, lard, lanolin, beef tallow, mutton tallow, other animal tallow, canola oil, castor oil, coconut oil, coriander oil, corn oil, cottonseed oil, hazelnut oil, hempseed oil, linseed oil, mango kernel oil, meadowfoam oil, neatsfoot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sesame oil, sunflower seed oil, tall oil, tsubaki oil, vegetable oils, marine oils, and combinations thereof.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of producing hydrogenated products, the method comprising:
   providing a wax and an oil;
   processing the wax and the oil with a gas under high shear conditions to form a high shear product; and
   hydrogenating the high shear product to produce hydrogenated products.

2. The method of claim 1, wherein the wax is a petroleum wax comprising alkane hydrocarbons with formula $C_nH_{2n+2}$, wherein n=20-40.

3. The method of claim 1, wherein the oil comprises at least one antioxidant selected from the group consisting of ascorbyl palmitate, tocopherol, and a hindered phenolic compound.

4. The method of claim 1, the method further comprising recycling a portion of the hydrogenated products through a high shear device; and transferring at least some high shear product from the high shear device to a reactor, wherein hydrogenating occurs in the reactor.

5. The method of claim 4, wherein the high shear device is configured with a rotor, a stator, and a catalytic surface, and wherein the high shear device is in fluid communication the reactor.

6. The method of claim 4, the method further comprising operating the high shear device at a shear rate in the range of about 20,000 $s^{-1}$ to about 1,600,000 $s^{-1}$, wherein the gas comprises hydrogen.

7. The method of claim 6, the method further comprising processing the wax and the oil until the high shear product comprises hydrogen gas bubbles with an average gas bubble diameter less than about 5 µm.

8. The method of claim 1, wherein the oil is selected from the group consisting of butterfat, cocoa butter, cocoa butter substitutes, illipe fat, kokum butter, milk fat, mowrah fat, phulwara butter, sal fat, shea fat, bomeo tallow, lard, lanolin, beef tallow, mutton tallow, other animal tallow, canola oil, castor oil, coconut oil, coriander oil, corn oil, cottonseed oil, hazelnut oil, hempseed oil, linseed oil, mango kernel oil, meadowfoam oil, neatsfoot oil, olive oil, palm oil, palm kernel oil, palm olein, palm stearin, palm kernel olein, palm kernel stearin, peanut oil, rapeseed oil, rice bran oil, safflower oil, sasanqua oil, soybean oil, sesame oil, sunflower seed oil, tall oil, tsubaki oil, vegetable oils, marine oils, and combinations thereof.

9. The method of claim 1, wherein hydrogenation occurs at a bulk reaction temperature in the range of about 100° C. to 260° C., and at a bulk reaction pressure in the range from about 202 kPa to about 6 MPa.

10. The method of claim 1, wherein hydrogenating accomplishes at least one of the following effects: desulfurization, hydrocracking, reduction of unsaturation content, and reduction of aromatic content.

11. The method of claim 1, wherein the high shear product has an iodine value of greater than 70.

12. The method of claim 1, the method further comprising mixing a hydrogen donor solvent with the wax, the oil, or with both, prior to the processing step.

13. A method of producing hydrogenated products, the method comprising:
   processing a wax and an oil with a gas comprising hydrogen in a high shear device to form a high shear product; and
   hydrogenating the high shear product to produce hydrogenated products,
   wherein the wax is a petroleum wax comprising alkane hydrocarbons with formula $C_nH_{2n+2}$, wherein n=20-40.

14. The method of claim 13, wherein the oil comprises at least one antioxidant selected from the group consisting of ascorbyl palmitate, tocopherol, a hindered phenolic compound, and combinations thereof.

15. The method of claim 13, further comprising transferring at least some high shear product from the high shear device to a reactor, wherein hydrogenating occurs in the reactor.

16. The method of claim 15, wherein the high shear device is configured with a rotor, a stator, and a catalytic surface, and wherein the high shear device is in fluid communication with the reactor.

17. The method of claim 16, the method further comprising processing the wax and the oil until the high shear product comprises gas bubbles with an average gas bubble diameter less than about 5 µm.

18. The method of claim 15, the method further comprising operating the reactor at a bulk reaction temperature in the range of about 100° C. to 260° C., and at a bulk reaction pressure in the range from about 202 kPa to about 6 MPa.

19. The method of claim 18, wherein the high shear product has an iodine value of greater than 70.

* * * * *